United States Patent Office 2,853,468
Patented Sept. 23, 1958

---

2,853,468

EPOXY ETHER RESIN-POLYMETHOXY ACETAL COMPOSITIONS

Robert Steckler, Russell, Ohio, and Jesse Werner, Holliswood, N. Y., assignors to General Aniline & Film Corporation, New York, N. Y., a corporation of Delaware No Drawing. Application October 4, 1956
Serial No. 613,831

12 Claims. (Cl. 260—47)

This invention relates to epoxy ether resin-polymethoxy acetal compositions, which in the presence of curing agents undergo cure to tough resinous materials having improved physical properties.

It is known that epoxy ether resins are useful in the manufacture of protective coatings, molding compositions, films, laminates, adhesives and the like. In order to reduce the thermal expansion of epoxy ether resins, especially for adhesive applications, coatings, etc., and to relieve stresses developed during cure of usage, fillers must be incorporated. If one attempts to approach the linear thermal expansion of metals, glass, ceramics, etc., a large amount of filler is required. This causes a considerable increase in viscosity, often rendering a compound too viscous for proper application and wetting, which usually results in a great loss in shear strength and adhesion.

It is an object of this invention to provide an epoxy ether resin-polymethoxy acetal composition having a viscosity lower than that of the resin alone, thereby permitting incorporation of more filler, resulting in greatly improved wetting, flow, adhesion and reduced shrinkage. This composition is capable of undergoing cure to tough resinous materials having improved shear and tensile strengths, and better electrical properties than the cured product obtained from the resin alone.

Other objects and advantages will become apparent from the following specifications.

We have found that blends of 50 to 5% by weight of a polymethoxy acetal and from 50 to 95% by weight of an epoxy ether resin will in the presence of a curing agent yield hardened resins having increased shear and tensile strengths and better electrical properties suitable for a variety of uses not attainable with cured epoxy ether resins alone.

The epoxy ether resins employed in accordance with the present invention are characterized by the following general formulae:

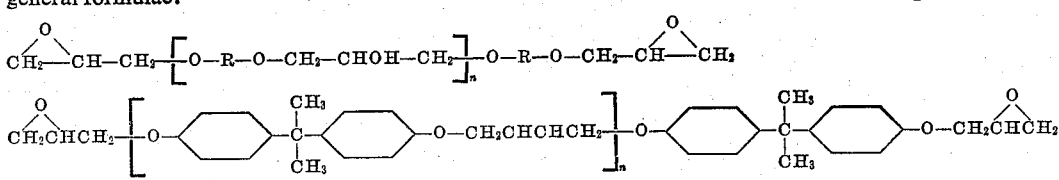

wherein R represents the divalent hydrocarbon radical of a dihydric phenol and n represents the extent of copolymerization. The epoxy ether resins have an epoxide equivalent ranging from 180 to 400. By "epoxy equivalent" as used herein and in the art is meant the grams of the polymeric material or resin containing one gram equivalent epoxide.

The epoxy ether resins are obtained by the procedures described in United States Patents 2,500,600; 2,633,458; 2,642,412; 2,324,483; 2,444,333; 2,520,145; 2,521,911 and 2,651,589; all of which are incorporated herein by reference for examples of the types of epoxy ether resins that may be employed in the process of our invention.

The polymethoxy acetals, which are blended with the aforestated epoxy ether resins, have the following general formula:

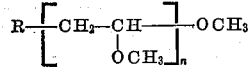

where n is an integer having a value ranging from 3 to 18 and preferably from 4 to 7 and R is hydrogen or lower alkyl, such as methyl, ethyl, propyl, butyl, etc.

The polymethoxy acetals characterized by the foregoing general formula are readily prepared in the conventional manner by the condensation of methyl vinyl ether and methyl alcohol or acetal (1,1-dimethoxyalkanes) in the presence of boron fluoride as a catalyst. The preparation of these compounds is fully described in U. S. P. 2,165,962 and 2,487,525.

It is to be noted, however, that in the above general formula wherein R is hydrogen, n represents the number of moles of alkyl vinyl ether used per mole of alkyl alcohol. For the purpose of the present invention, we prefer to employ products in which n has the value of 4 to 7, and mixtures thereof. In this connection, it is to be noted that "n" also represents the average degree of polymerization in the foregoing general formula of the resulting polymethoxy acetal. In other words, "n" indicates how many repeating units there are in the unfractionated product on the average. The product, i. e. polymethoxy acetals characterized by the foregoing structural formula, are mixtures which can, for the sake of clear explanation, be called n:1 polymethoxy acetals, which, when abbreviated are referred to herein as PMAC–n, or n:1 methoxy acetals. When n is 4, 4 moles of methyl vinyl ether and one mole of methyl alcohol are involved in the condensation reaction. The resulting product, therefore, can be identified as 4:1 polymethoxy acetals, PMAC–4, or 4:1 methoxy acetals.

Individual members of the PMAC series as disclosed in U. S. P. 2,165,962 are as follows: 1,1-dimethoxyethane; 1,1,3 - trimethoxybutane; 1,1,3,5 - tetramethoxyhexane; 1,1,3,5,7 - pentamethoxyoctane; 1,1,3,5,7,9 - hexamethoxydecane; 1,1,3,5,7,9,11 - heptamethoxydodecane; 1,1,3,5,7,9,11,13-octamethoxytetradecane; and in general, 1,1,3,5 . . . (2n−1)-polymethoxyalkanes. The number of polymethoxy groups is n+1 on the average for PMAC–n. The number of carbon atoms in the parent alkane is 2n. For instance, in 5:1 methoxy acetals, also called PMAC–5, a principal individual homolog has the structure—

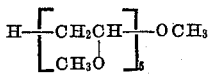

and the name of this important individual member is 1,1,3,5,7,9 - hexamethoxydecane. Unfractionated PMAC–5 also contains—

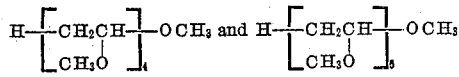

and lesser amounts of—

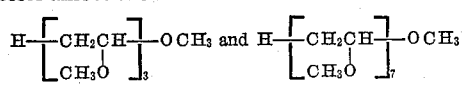

as well as 1,1,3-trimethoxybutane, 1,1-dimethoxyethane (unless distilled off), and higher homologs.

The preferred polymethoxy acetals are those where the average value of n is about 5. These compounds are practically colorless liquids of a faint ethereal odor having the following approximate physical properties:

| | |
|---|---|
| Specific gravity, 25/4° C | 0.978 |
| Pour point, ° F | −55 |
| Flash point, ° F (open cut) | 255 |
| Refractive index $n_D^{25}$ | 1.440 |
| Initial boiling point, ° C | 140–160 |
| Viscosity, 25° C. (centistokes) | 15 |

In order to cure or harden the aforestated epoxy ether resins and compositions containing them, various types of curing agents have been proposed, such as alkalies, sodium or potassium hydroxide, alkali-phenoxides like sodium phenoxides; carboxylic acids or anhydrides such as formic acid, oxalic acid or phthalic anhydride; Friedel-Crafts metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, pyridine, piperdine, dicyandiamide, m-phenylenediamine, melamine and the like. These substances are added and mixed with the epoxy resin or composition containing it in order to effect the curing or hardening thereof, the amounts varying considerably depending upon the particular agent or mixture of agents employed.

In carrying out the invention 5 to 50% by weight of a polymethoxyacetal and 50–95% by weight of an epoxy ether resin are blended to form a uniform mixture. If the epoxy is normally solid or very viscous, blending may be facilitated by the use of heat. Otherwise, mixing, or mixing with gentle warming, is sufficient. To the blend or mixture 5 to 50 parts by weight of any one of the aforementioned hardening agents are incorporated to give a uniform mixture, and this resulting mixture can be cured or resinified to hard tough resins suitable for use such as protective coatings, adhesives, and the like, having improved tensile and shear strength and better electrical properties than the use of epoxy ether resin compositions not containing polymethoxy acetals.

Depending upon the application to which the compositions are put, they may also contain besides the epoxy ether resin and polymethoxy acetals, one or more of other materials, such as fillers, pigments, and other resins as exemplified by the epoxy ether resin art.

The compositions prepared in accordance with the present invention have many wide and varied commercial applications not possible with the use of epoxy ether resins alone, or the customary fillers. In adhesive formulations, the compositions of this invention give tensile and shear strengths far greater than that attainable from straight epoxy ether resins, or resins and customary fillers. Highly pigmented epoxy ether resins, especially in adhesive formulations are much lower in shear strength than those containing a small amount of filler. We have found, contrary to this, that the polymethoxy acetal containing epoxy ether resins show optimum strength at high pigmentation. This unusual feature results in not only a lower coefficient of expansion, but a lower cost of the composition itself.

The compositions as prepared in accordance with the present invention do not have a critical curing time. Thus prolonged heating of the polymethoxy acetal containing system does not contribute to deterioration or brittleness. The presence of the polymethoxy acetals in the epoxy ether resins precludes the use of customary organic diluents, and eliminates odor problems that are generally encountered with volatile and odoriferous ether compounds generally used as diluents or curing agents.

The presence of the polymethoxy acetals in the epoxy ether resins results in lower viscosity compositions with improved wetting and compatibility and without effecting adversely any of the excellent working properties of the cured resin, especially the electrical properties.

The foregoing improvement and advantages are not limited to specific conditions but apply regardless of the type of filler added or curing agent. The polymethoxy acetals greatly improve the compatibility of the epoxy ether resins with polyamide resins, such as, the polyamide obtained from dimerized fatty acid and diethylene triamine, and the resulting cured resins possess far better uniformity, gloss, clarity, and strength.

The unusual and unexpected action of the polymethoxy acetals in the epoxy ether resin blend is not known at the present time. From our numerous experiments, we are led to believe that the polymethoxy acetals enter into a cross-linking reaction with the epoxy ether resin.

The incorporation of the polymethoxy acetals to the epoxy ether resins actually increases the tensile and shear strength above that of the unmodified epoxy ether resin, when cured. In view of these properties, it is reasonable to conclude that the polymethoxy acetals enter the cross-linking reaction.

The following examples will illustrate the preparation of the compositions of the present invention and the new and unexpected results obtained therefrom.

It is to be clearly understood that these examples are merely illustrative, and are not to be construed as being limitative of the invention claimed.

All parts are by weight unless otherwise noted.

EXAMPLE I

Preparation of epoxy ether resin A

Bis-phenol is dissolved in epichlorhydrin in the proportion of 5,130 parts (22.5 moles) of bis-phenol in 20,812 parts (225 moles) of epichlorhydrin and 104 parts water. The solution is prepared in a kettle provided with heating and cooling equipment, agitator, distillation condenser and receiver. A total of 1,880 parts of solid 97.5% sodium hydroxide, corresponding to 2.04 moles of sodium hydroxide per mole of bis-phenol (2% excess) is added in installments. After the last addition of sodium hydroxide with completion of the reaction, the excess epichlorhydrin is removed by vacuum distillation with use of a kettle temperature up to 150° C. and a pressure of 50 mm. mercury. After completion of distillation, the residue is cooled to 90° C., and about 360 parts benzene added. Cooling drops the temperature to 40° C. with precipitation of salt from the solution. The salt is removed by filtration, and the removed salt carefully washed with 360 parts benzene to remove any polyether therefrom. The two benzene solutions are combined and the benzene distilled off at a temperature up to 170° C. at 25 mm. pressure. The resulting glycidyl polyether of bis-phenol has a Durran's mercury method softening point of 9° C., an average molecular weight of 370 by ebullioscopic measurement in ethylene dichloride, and an epoxide value of 0.50 epoxy equivalents per 100 grams. It has an epoxide equivalent weight of 200 and a 1,2-epoxy equivalency of 185. The product is designated herein as epoxy ether resin A.

Epoxy ether resin B

A solution consisting of 11.7 parts of water, 1.22 parts sodium hydroxide, and 13.38 parts of bis-phenol is prepared by heating the mixture of ingredients to 70° C., then cooling to 46° C., at which temperature 14.06 parts of epichlorhydrin are added with agitation. After 25 minutes, a solution of 5.62 parts sodium hydroxide in 11.7 parts water is added over a fifteen minute period. The temperature rises to 63° C. After 30 additional minutes, the product is washed with water for 4½ hours, then dried by heating to 140° C. for 80 minutes, followed by rapid cooling. At room temperature, the product is an extremely viscous semi-solid having a softening point of 27° C. by Durran's mercury method, and epoxide equivalent weight of 245, and a molecular weight of 460. The 1,2-epoxy equivalency is 1.88. This product will be referred to hereinafter as epoxy ether resin B.

*Preparation of epoxy ether resin C*

Epoxy ether resins of higher molecular weight are prepared by using smaller ratios of epichlorhydrin to bis-phenol. In a vessel fitted with agitator, 228 parts (1 mole) of bis-phenol and 86 parts (2.14 moles) sodium hydroxide as a 10% aqueous solution are introduced and heated to about 45° C. whereupon 189 parts (2.04 moles) of epichlorhydrin are added rapidly with agitation. The temperature of the mix is then gradually increased, and held at 92° C. for 80 minutes. The mixture separates into a two phase system, and the aqueous layer is drawn off from the taffy-like product which forms. The latter is washed with hot water while molten until the wash water is neutral to litmus. The product is then drained and dried by heating to 130° C. The softening point of the resulting glycidyl polyether is 43° C. The measured molecular weight is 620, and it has an epoxide value of 0.29 epoxy equivalents per 100 grams. The epoxide equivalent weight is 345, and the 1,2-epoxy equivalency is 1.8. It will be identified hereinafter as epoxy ether resin C.

EXAMPLE II 80 parts epoxy ether resin B and 20 parts polymethoxy acetal with an $n$ value of 5 were intimately mixed with 100 parts Alcoa Insulating Powder R-20, 6.0 parts diethylenetriamine (based on weight of epoxy ether resin B only) were added, and the entire mix then ground on a three-roll differential-speed mill. Steel blocks, 3" x 1" x 1/8" were then coated over a one square inch area, and the coated areas assembled and held in place for 15 hours at 60–65° C.

The shear strength of test blocks prepared in this manner in p. s. i. is 1,990.

100 parts epoxy ether resin A were mixed with 100 parts Alcoa Insulating Powder R-20 and 6.0 parts diethylenetriamine were added, and the mix intimately ground on a three roll differential speed mill. Epoxy ether resin A was chosen so that the final viscosities of the prepared mixes, prior to curing, would be identical. Steel blocks, 3" x 1" x 1/8", were then coated over a one inch area, and the coated areas assembled and held in place for 15 hours at 60–61° C.

The shear strength of test blocks prepared in this manner in p. s. i. is 750.

The Alcoa Insulating Powder R-20 utilized in the above and foregoing examples is a yellowish-brown dry powder produced from bauxite residue by elutriation. It is extremely fine, and almost completely absent of gritty particles.

Density—approx. 50 pounds per cubic foot
Fineness—minus 300 mesh

*Approximate analysis*

| | Percent |
|---|---|
| $Al_2O_3$ | 26 |
| $Fe_2O_3$ | 17 |
| $SiO_2$ | 14 |
| $TiO_2$ | 11 |
| CaO | 10 |
| $Na_2O$ | 10 |
| Loss on ignition | 12 |

EXAMPLE III 80 parts epoxy ether resin B were mixed with 20 parts polymethoxy acetal with an $n$ value of 5 and 60 parts Alcoa Insulating Powder R-20 added, and 6.0 parts diethylenetriamine (based on weight of epoxy ether resin B only) were added, and the entire mix then ground on a three roll differential speed mill. Steel blocks were then prepared and cured as in Example I. The shear strength was determined as 2,000 p. s. i.

100 parts epoxy ether resin A were mixed with 60 parts Alcoa Insulating Powder R-20, and 6.0 parts diethylenetriamine were added, and the mix intimately ground as above. Steel blocks were prepared and cured in the usual manner, and the shear strength of the bond was determined as 1,440 p. s. i.

Thus it can be seen that in filled polyether compositions the shear strength decreases as the percentage filler increases. It can also be seen that in filled polyether compositions containing polymethoxy acetal, the shear strength is still at an optimum even in highly filled systems.

EXAMPLE IV

Filled polyether systems were prepared with varying ratios of polymethoxy acetal, and the effect of shear strength was noted, as well as the effect of curing agent content. It was found that the ratio of polyether to polymethoxy acetal could be varied over a wide span, still giving good physical properties. The preferred ratio appears to be about 80/20. It should be noted that higher shear strength is obtained if the curing agent added is based on the total weight of polyether and polymethoxy acetal, and not the polyether only. This is an indication that perhaps the polymethoxy acetal actually enters the curing process, rather than just acting as an inert fluidizing agent. The results of these studies are shown in the following table:

| Epoxy Ether Resin B | PMAC n 5 | Alcoa Insulating Powder R-20 | Diethylene triamine | Shear Strength, p.s.i.—air dry 4 days | Shear Strength, p.s.i.—15 hrs. at 60–65° C. |
|---|---|---|---|---|---|
| 90.0 | 10.0 | 125.0 | 6.0 | 1,590 | 1,100 |
| 85.0 | 15.0 | 125.0 | 6.0 | 2,150 | 2,565 |
| 80.0 | 20.0 | 125.0 | 6.0 | 1,750 | 2,865 |
| 75.0 | 25.0 | 125.0 | 6.0 | 1,250 | 2,415 |
| 70.0 | 30.0 | 125.0 | 6.0 | 865 | 1,540 |
| 65.0 | 35.0 | 125.0 | 6.0 | 1,475 | 2,090 |
| 80.0 | 20.0 | 125.0 | 4.8 | 590 | 1,315 |
| 65.0 | 35.0 | 125.0 | 3.9 | 200 | 240 |

EXAMPLE V 37.5 parts epoxy ether resin B, 12.5 parts epoxy ether resin A, 50 parts Alcoa Insulating Powder R-20, 5 parts allyl glycidyl ether were intimately mixed, and then 12.5 parts triethyl amine added and the mix ground. Steel test block prepared and cured by air dry gave a shear strength of 1450 p. s. i. and cured by 15 hours at 60° C. gave a shear strength of 1825 p. s. i.

EXAMPLE VI

Example V was repeated exactly, except that 6 parts diethylamino propylamine were used as curing agent. Air dried blocks gave a shear strength of 1055 p. s. i. and those cured for 15 hours at 60° C. gave a shear strength of 1475 p. s. i.

EXAMPLE VII

Example V was repeated exactly, except that 6 parts diethylenetriamine were used as curing agent. Air dried blocks gave a shear strength of 1185 p. s. i. while 60° C. cured blocks gave a shear strength of 2465 p. s. i.

EXAMPLE VIII

Example V was repeated exactly, except that the allyl glycidyl ether was replaced by 5.0 parts polymethoxy acetal having an $n$ value of 4. Shear strength for air dry blocks was 1765 p. s. i., for 60° C. cured blocks 1960 p. s. i.

EXAMPLE IX

Example V was repeated exactly, except that 5.0 parts polymethoxy acetal having an $n$ value of 6 replaced the allyl glycidyl ether. Air dry shear strengths are 1250 p. s. i. 60° C. cured shear strengths are 2550 p. s. i.

EXAMPLE X

Example V was repeated exactly, except that 5.0 parts polymethoxy acetal having an $n$ value of 3 replaced the allyl glycidyl ether. Air dry shear strengths are 1940 p. s. i. 60° C. cured shear strengths are 2920 p. s. i.

EXAMPLE XI

Example V was repeated exactly, except that 5.0 parts polymethoxy acetal having an $n$ value of 10 replaced the allyl glycidyl ether. Air dry shear strengths are 2090 p. s. i. 60° C. cured shear strengths are 2415 p. s. i.

EXAMPLE XII

Example V was repeated exactly, except 5.0 parts polymethoxy acetal having an $n$ value of 15 replaces allyl glycidyl ether. Air dry shear strengths are 1890 p. s. i. 60° C. cured shear strengths are 2510 p. s. i.

EXAMPLE XIII

Example V was repeated exactly, except 5.0 parts polymethoxy acetal having an $n$ value of 18 replaces allyl glycidyl ether. Air dry shear strengths are 1750 p. s. i. 60° C. cured shear strengths are 2290 p. s. i.

We claim:

1. A composition of matter which undergoes curing in the presence of an epoxy ether curing agent to a tough resinous material having increased shear and tensile strength comprising 50–95% by weight of a glycidyl polyether of a polyhydric phenol having an epoxide equivalent ranging from 180 to 400 and 50–5% by weight of at least one polymethoxy acetal having the following general formula:

$$R\text{---}\left[CH_2\text{---}CH\text{---}\right]\text{---}OCH_3$$
$$\phantom{R\text{---}\left[CH_2\text{---}}|\phantom{CH\text{---}\right]\text{---}OCH_3}$$
$$\phantom{R\text{---}\left[CH_2\text{---}}OCH_3\phantom{\right]_n}$$

wherein R represents a member selected from the class consisting of hydrogen and an alkyl group of from 1 to 4 carbon atoms, and $n$ represents an integer of 3 to 18.

2. A composition of matter according to claim 1 wherein the polymethoxy acetal has the following formula:

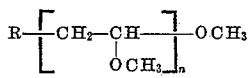

3. A composition of matter according to claim 1 wherein the polymethoxy acetal has the following formula:

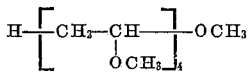

4. A composition of matter according to claim 1 wherein the polymethoxy acetal has the following formula:

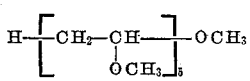

5. A composition of matter according to claim 1 wherein the polymethoxy acetal has the following formula:

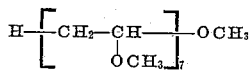

6. A composition of matter according to claim 1 wherein the polymethoxy acetal has the following formula:

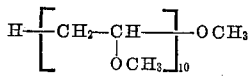

7. The process of hardening into a tough resinous material having increased shear and tensile strength which comprises hardening in the presence of an epoxy ether curing agent a mixture of 50–95% by weight of a glycidyl polyether of a polyhydric phenol having an epoxide equivalent ranging from 180 to 400 and 50–55% by weight of at least one polymethoxy acetal having the following general formula:

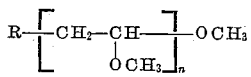

wherein R represents a member selected from the class consisting of hydrogen and an alkyl group of from 1 to 4 carbon atoms, and $n$ represents an integer of 3 to 18.

8. The process according to claim 7 wherein the polymethoxy acetal has the following formula:

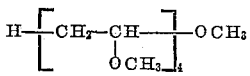

9. The process according to claim 7 wherein the polymethoxy acetal has the following formula:

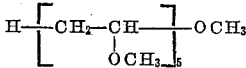

10. The process according to claim 7 wherein the polymethoxy acetal has the following formula:

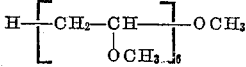

11. The process according to claim 7 wherein the polymethoxy acetal has the following formula:

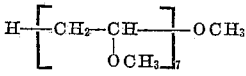

12. The process according to claim 7 wherein the polymethoxy acetal has the following formula:

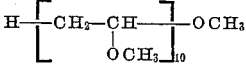

References Cited in the file of this patent

UNITED STATES PATENTS

| | | |
|---|---|---|
| 2,487,525 | Copenhaver | Nov. 8, 1949 |
| 2,713,567 | Scheibli | July 19, 1955 |